United States Patent [19]

Gaudfrin

[11] Patent Number: 4,935,138
[45] Date of Patent: Jun. 19, 1990

[54] PRESS-FILTER WITH ENDLESS FILTERING WEBS

[76] Inventor: Guy Gaudfrin, Allée du Bec de Canard, Golf, 78860 Saint-Nom-la-Breteche, France

[21] Appl. No.: 253,619

[22] Filed: Oct. 5, 1988

[30] Foreign Application Priority Data

Oct. 7, 1987 [FR] France ................. 87 13859

[51] Int. Cl.⁵ ........................................... B01D 33/04
[52] U.S. Cl. ..................... 210/386; 210/401; 100/47; 100/118
[58] Field of Search ............... 210/400, 401, DIG. 3, 210/386; 100/118, 119, 120, 151, 153, 154, 47; 162/349

[56] References Cited

U.S. PATENT DOCUMENTS

| | | | |
|---|---|---|---|
| 799,153 | 9/1905 | Fullner | 210/401 |
| 3,799,052 | 3/1974 | Kusters et al. | 100/153 |
| 3,973,483 | 8/1976 | Appenzeller | 100/153 |
| 4,045,853 | 9/1977 | White | 210/402 |
| 4,157,065 | 6/1979 | Schinko | 100/45 |
| 4,266,474 | 5/1981 | Bahr | 100/118 |
| 4,303,523 | 12/1981 | Ruppnig | 210/386 |
| 4,501,669 | 2/1985 | Hakansson et al. | 210/401 |

FOREIGN PATENT DOCUMENTS

| | | |
|---|---|---|
| 723195 | 7/1942 | Fed. Rep. of Germany . |
| 0105366 | 8/1979 | Japan ................. 210/386 |

*Primary Examiner*—W. Gary Jones
*Assistant Examiner*—Matthew O. Savage
*Attorney, Agent, or Firm*—Lewis H. Eslinger; Jay H. Maioli

[57] ABSTRACT

A press-filter including a chassis, two endless filtering webs, guide rollers defining paths for the two webs, the paths of which are partially contiguous, and several squeezing rollers located on either side of the filtering webs along their contiguous path portions and squeezing the webs, one of which consists of a drum. The press-filter further includes a curved rigid roller race at least partially encircling the drum and spaced therefrom by a predetermined gap. A plurality of squeezing rollers are rollably mounted on the roller race wherein the filtering webs encircle the drum over a major portion of its periphery and pass between the drum and the squeezing rollers.

14 Claims, 5 Drawing Sheets

FIG.1

PRESS-FILTER WITH ENDLESS FILTERING WEBS

FIELD OF THE INVENTION

The present invention relates to a press-filter with endless filtering webs.

BACKGROUND OF THE INVENTION

Various types of continuous presses are currently known in which two suitably stretched endless filtering webs are used, the material to be drained being introduced between these two webs and progressively pressed by means of a succession of rollers.

When the webs pass over a roller while being sufficiently wound thereon, the pressure necessary for draining the material is generated by the tension of the outer web.

When the webs pass between two juxtaposed rollers, the pressure is generated by squeezing the material between the rollers. Draining in this case is helped by a shearing effect due to the simultaneous deformation or creeping of the material.

All the currently known web presses differ from one another in the way in which the single rollers or the squeezing rollers are positioned, in the way the webs are stretched and guided, in the prior draining systems that they use, etc...

Although they are found to be satisfactory, they nonetheless present certain disadvantages which limit their performances and involve rather high operating costs.

To exert a high pressure and drive them, the filtering webs have to be stretched as much as possible. Consequently, the resistance of the webs and of their junctions limits the possibilities of the press.

Webs are indeed expected to be capable of filtering the material without allowing solids through as well as to withstand very high tensions, two functions which are incompatible.

The web is, as far as possible, chosen to have properties which are a compromise between these two opposite qualities, to the detriment of performances.

When using squeezing rollers between which the webs are squeezed with the material, the choice is even more difficult. It is moreover necessary to use factory-produced endless webs, of which the replacement implies taking the structure of the machine to pieces.

Another disadvantage found with all web presses is that they have no means of holding back the material laterally when the material creeps under pressure before compacting. This implies having to feed the material over a small width in the center of the webs, in order to leave on each side sufficient room for the material to creep without leaking out.

It is also known that, in order to reach rates of dryness close to the pressability limits, it is necessary to use the shearing effect produced by juxtaposed rollers, by going through as many stages of compression as possible, which represents high investments.

Indeed, it means multiplying pairs of juxtaposed strongly built rollers in order to avoid any bending likely to interfere with the squeezing, one roller in each pair having to be necessarily applied against the other by a jack articulation system.

SUMMARY OF THE INVENTION

It is now the object of the present invention to propose a press-filter comprising a chassis, two endless filtering webs, rollers mounted on to the chassis and defining paths for the two webs, which paths are at least partially contiguous, and several sets of guide rollers located on either side of the filtering webs along their contiguous path portion and squeezing the webs, press-filter wherein one of the rollers is a drum, the filter comprises a curved non-deformable rigid roller race at least partially encircling said drum and spaced therefrom by a predetermined gap, and a plurality of squeezing rollers rollably mounted on said roller race, the filtering webs encircling said drum over a major portion of its periphery and passing between the drum and the squeezing rollers.

The essential characteristic of the invention resides therefore in an assembly comprising a draining drum and numerous rollers joined together to form a chain rolling on a rigid curved roller race. The filtering webs containing the material to be drained are caught between the drum and the chain. The curvature of the rigid roller race is such that the gap between the drum and the chain decreases during rotation In this way, the material is gradually compressed as it progresses forward while undergoing a shearing effect each time it passes over a roller.

It is thus possible to provide a large number of stages of compression by squeezing between the rollers and to increase the number of rollers at discretion, without having to use strongly built rollers, seeing that they are supported by a rigid roller race which enables them to withstand, without bending, the pressure generated by squeezing the material, thereby eliminating the need for the rollers and jack-articulation systems referred to hereinabove.

According to another characteristic of the invention, the two filtering webs are subjected to small tensions, while being driven by a third web called a leading web.

It is then possible to choose, on the one hand, filtering webs which are constituted by a web having, above all, a very good filtration threshold, and on the other hand, a leading web with a very high tensile strength.

Yet another characteristic of the invention consists in mounting the drum on a fixed shaft equipped with eccentric members. Pivoting of the shaft changes the position of the drum with respect to the rigid roller race, changing at the same time the ratio between the inlet opening and the outlet opening, namely the rate of compression.

The tension load of the leading web being dependent on the pressure exerted on said belt, it is possible to keep the rate of compression to the maximum value by adjusting it manually or automatically from the driving torque. Thus, a maximum of the possibilities of the machine are used.

After a first moderate compression obtained by conventional means, it may happen that the material keeps up a tendency to creep by penetrating between the draining drum and the chain of squeezing rollers. For this reason, another characteristic of the invention is to provide a draining drum equipped on either side with flanges to hold back the material tending to leak out and at the same time to guide the roller chain.

It is then possible to feed the material over a greater width of the filtering webs than with the currently used presses and therefore to improve the production output.

BRIEF DESCRIPTION OF THE DRAWINGS

The invention will be more readily understood on reading the following description with reference to the accompanying drawings, in which:

FIG. 1 shows a longitudinal section of the press-filter according to the invention;

DETAILED DESCRIPTION OF PREFERRED EMBODIMENTS

Figure 1:
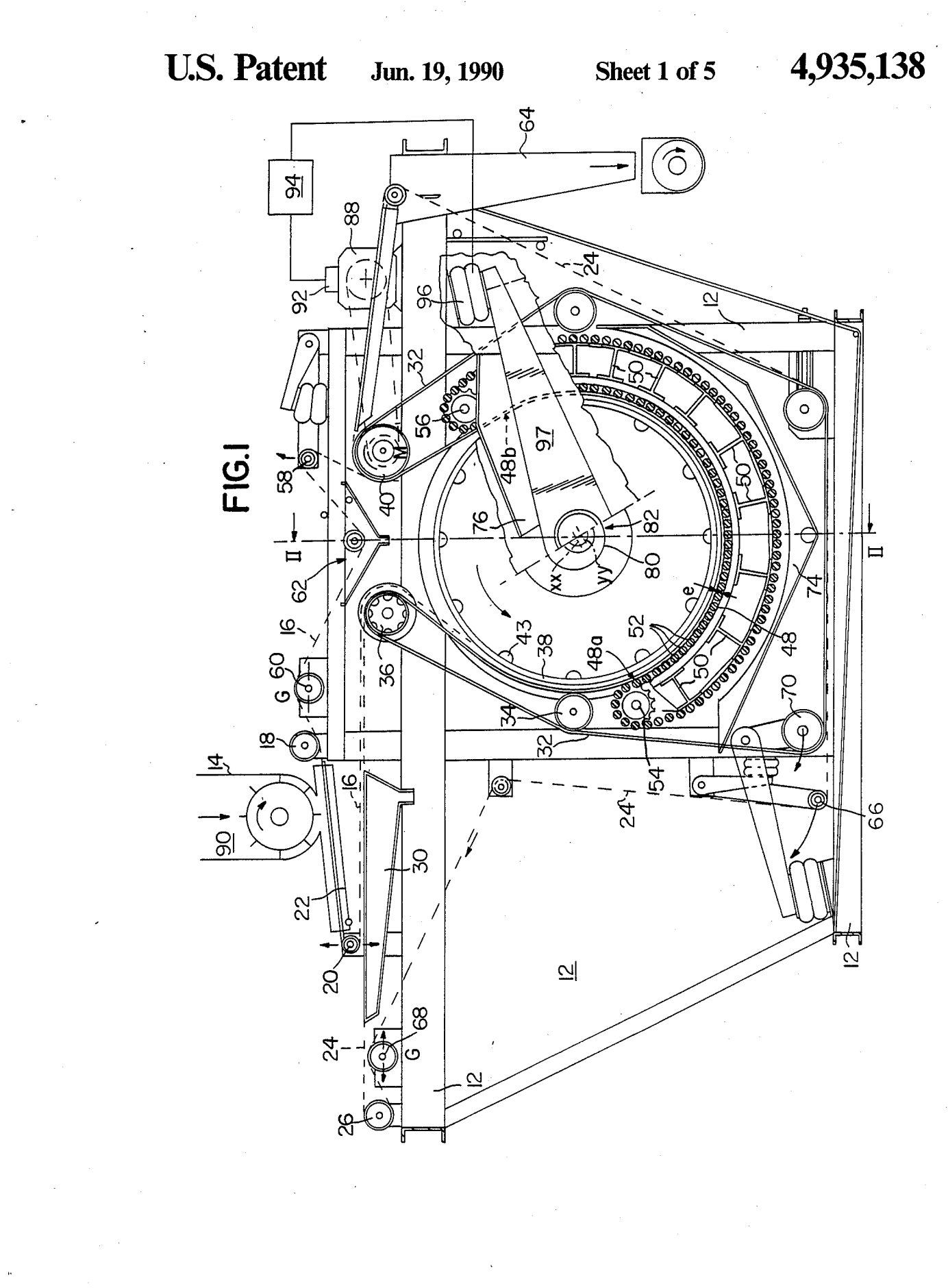
Figure 2:
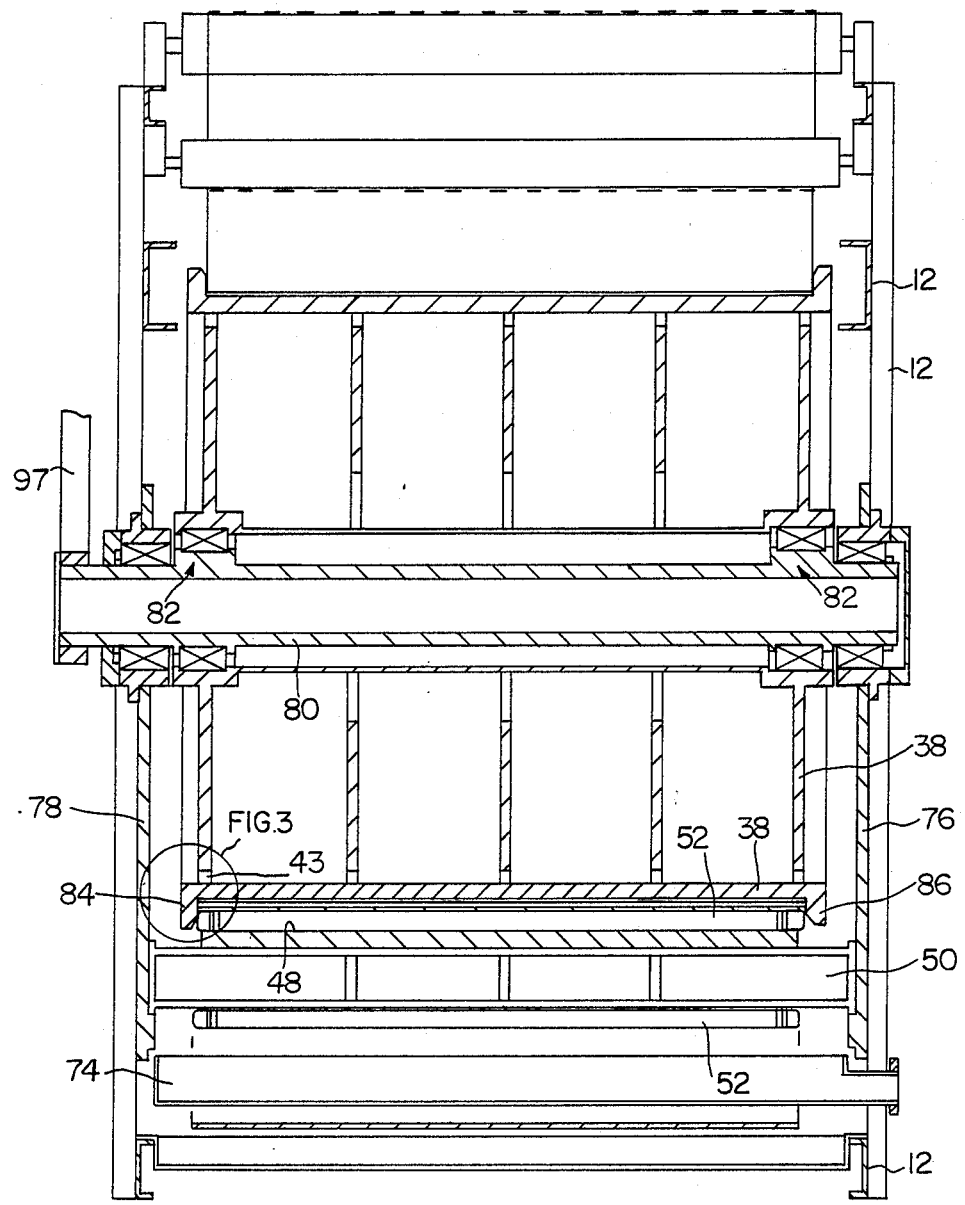
FIG. 2 shows an axial section of the drum of the press-filter of FIG. 1 taken along line II—II.

Referring first to FIG. 1, the continuous press-filter according to the invention is composed of a chassis 12 and of a certain number of rollers, as well as a drum, all of which support two conjugated endless filtering webs.

At the inlet to the machine, there is provided a feeding hopper or any other equivalent device, such as for example a positive displacement pump delivering through a distributor, for distributing the materials to be drained evenly on a first endless filtering web 16.

Said first filtering web is guided according to a slightly descending path at the level of the hopper 14, between two rollers 18 and 20, above a draining tank 22 collecting part of the liquid contained in the materials to be drained.

At the level of roller 20, the web 16 changes direction by about 180° and joins up with the second filtering web 24, stretched a short distance beneath the first between two rollers 26 and 36, and likewise following a slightly descending path above a second draining tank 30.

The two webs wind up together around roller 36 where they are rejoined by a leading web 32. From then on, the two filtering webs and the leading web progress together into the press-filter confining between them the materials to be drained, up to their separating point as will be seen hereinafter.

The roller 36 is situated virtually above the filtering drum in order that the assembly, composed of the filtering webs, the materials and the leading web, winds up around the drum 38 over a major portion of its periphery and as far as an output roller 40 which is also the drive roller driving the leading web.

An equalizing roller 34 is placed in facing relationship to the drum 38 in the initial contact zone of leading web 32 and filtering webs 16,24 on the drum 38.

The object of that roll is essentially to even up the layer of materials to be drained before this layer continues its progression around the drum.

Its other object is to guide the web 32 before this reaches roller 36.

Figure 3:
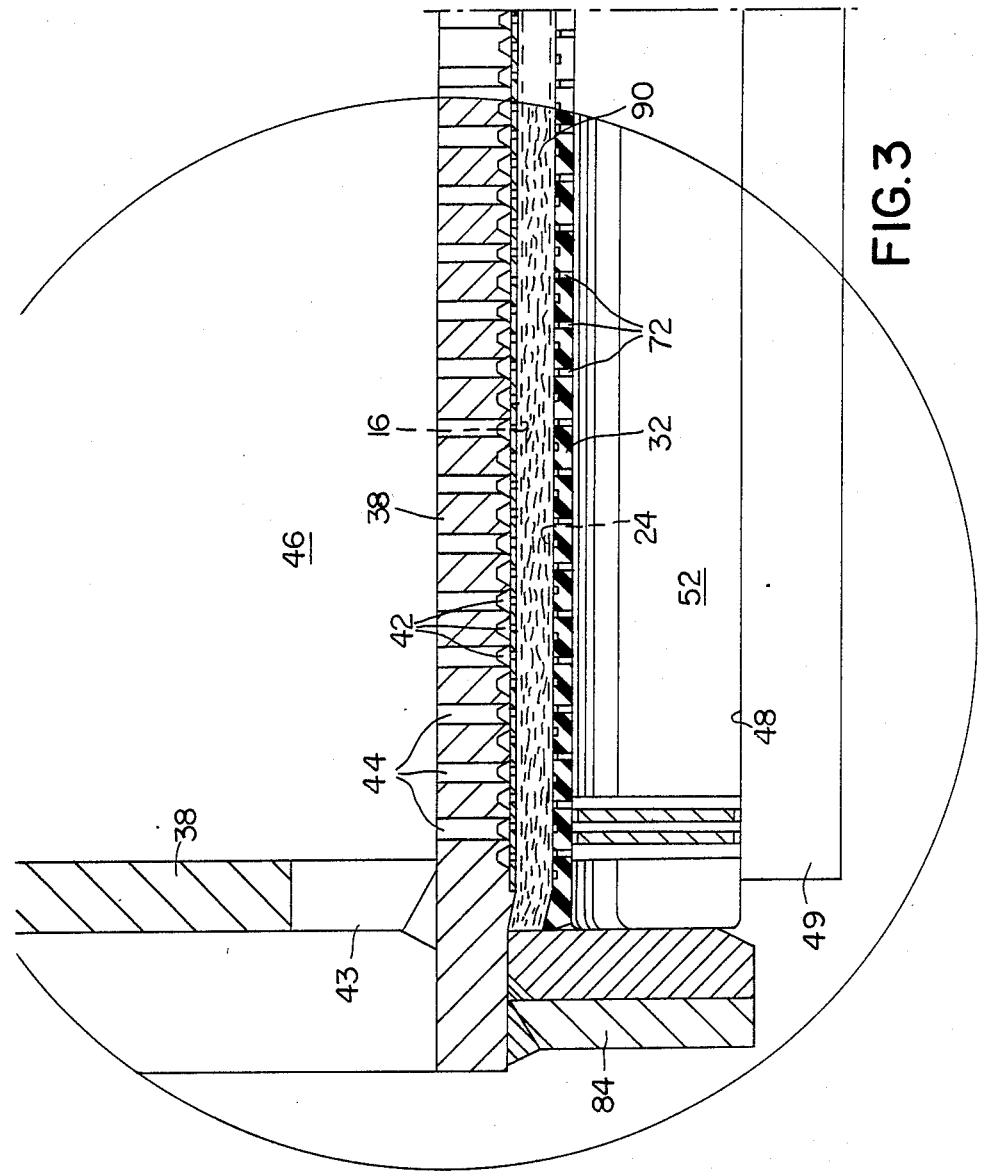
FIG. 3 is an enlarged scale cross-section of a detail of FIG. 2 contained in Zone III.

According to the embodiment illustrated in FIG. 3, the drum 38 is provided with peripheral grooves 42, for draining the liquids traversing the filtering web 16 applied against the drum, and with multiple holes 44 by which the grooves 42 communicate with the drum internal volume 48 issuing on the outside via lateral passages 43.

Figure 4:
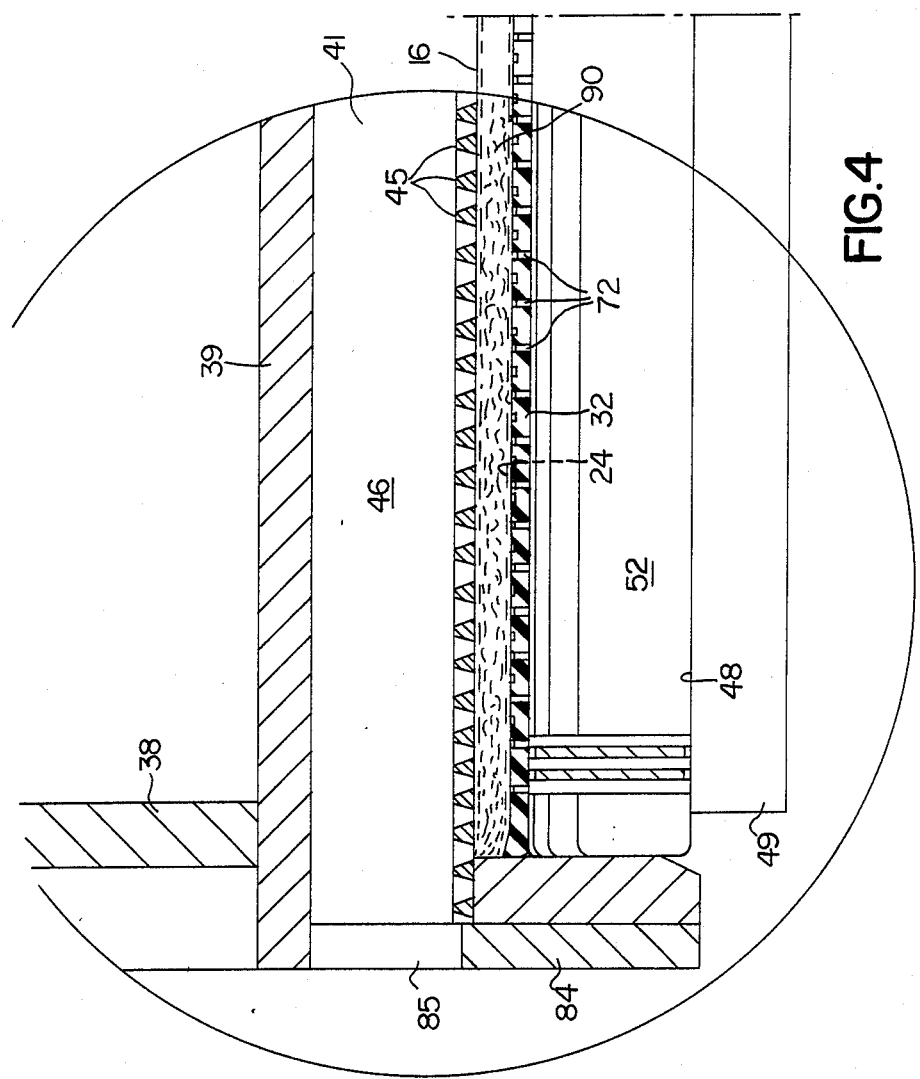
FIGS. 4 and 5 are views similar to FIG. 3, illustrating two other embodiments of the invention.

According to a variant illustrated in FIG. 4, the drum comprises a one-piece outer cylinder 39 provided with ribs 41 extending parallel to the drum axis, about which ribs is wound a steel wire 43, into non-contacting turns. The wire may have a trapezoidal cross-section, as in the illustrated example, the small base of the trapezoid facing the inner side in contact with the ribs 41. This arrangement constitutes what is suitably called a "JOHNSON" mesh.

A draining volume is thus defined between the turns of the wire 43 and the cylinder 39 of the drum, which volume issues on the outside at its two ends via passages 85 formed in flanges 84 described hereinafter.

Figure 5:
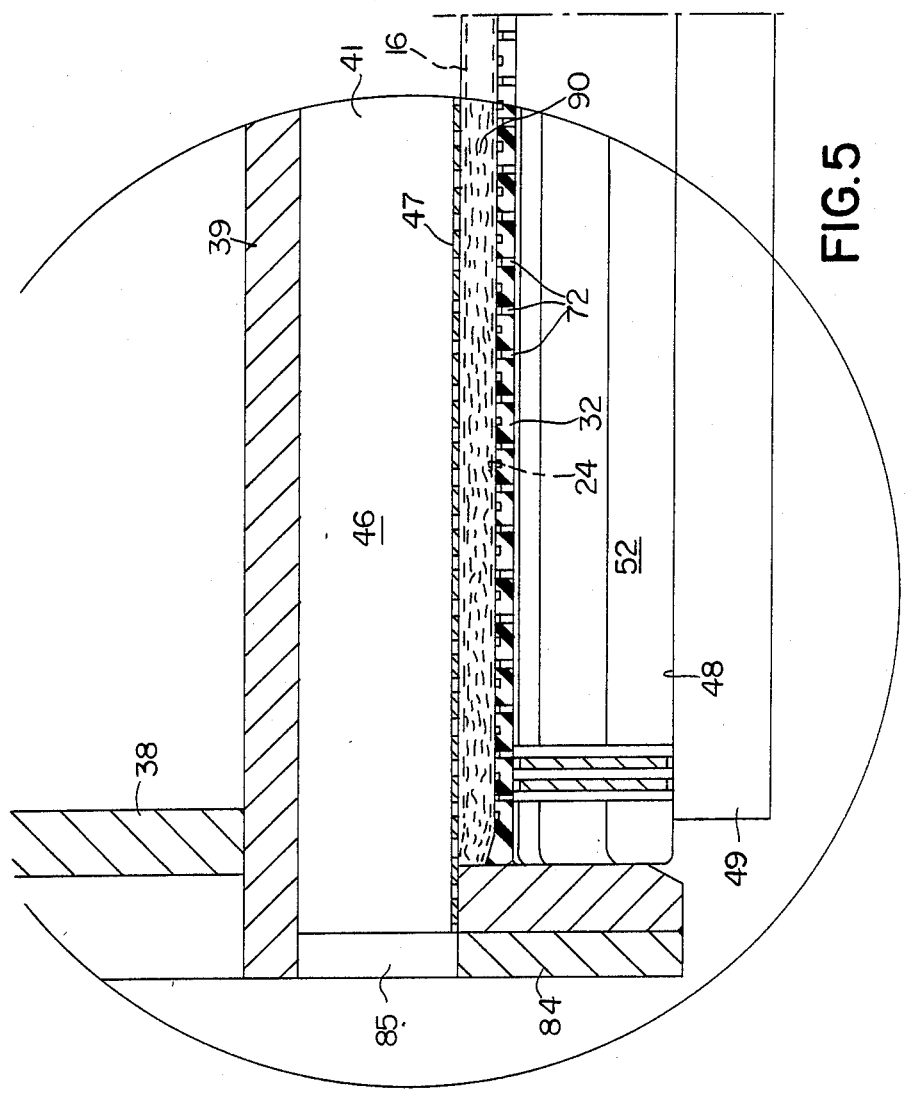

According to the variant illustrated in FIG. 5, the drum further comprises a one-piece outer cylinder 39 provided with ribs 41 extending in parallel to the drum axis. A low-gauge mesh 47 is wound around said ribs 41.

In the two cases, the filtered liquid does not penetrate inside the drum, thus preserving the latter against corrosion and as a result, reducing the number of parts having to be produced from a corrosion-resistant material or having to be protected against corrosion.

Over about 180°, the drum is encircled by a rigid curved roller race 48 carried by a frame 50 fixedly attached to the chassis 12 of the press-filter. A plurality of squeezing rollers 52 are provided on said roller race, which rollers are interconnected at their ends by links, not shown, in order to constitute a chain of squeezing rollers rolling at regular intervals along a closed loop path, composed of an internal portion along which the rollers roll along the roller race 48 while being confined between said roller race and the leading web 32.

The gap e separating the periphery of the drum 38 from the roller race 48 is progressively decreasing from the inlet end 48a of the roller race to the outlet end 48b, so that the gap separating the two filtering webs 16,24 is correlatively decreasing The path of the squeezing rollers is also composed of a return portion external to the frame 50, linking between the internal and external portions being achieved by winding the squeezing rollers around intermediate gear wheels 54, 56.

As indicated hereinabove, the two filtering webs 16, 24 and the leading web 32 separate at the level of the drive roller 40. Filtering web 16 then returns to as far as the feeding hopper 14 by passing through the upper part of the filter over a tension roller and a guide roller 80 and through a washing device 62.

Filtering web 24 returns to roller 26 by passing through the lower part of the filter, via a hopper 64 receiving the pressed and filtered materials, through a tensioning roller 68 and a guide roller and also through a washing installation, not shown.

Leading web 32 also returns toward roller 36 by passing through the lower part of the filter, via a tensioning roller 70.

Leading web 32 is provided with through passages 72, as can be seen in FIG. 3, allowing draining of the liquids between the squeezing rollers 52 and up to the roller race 48. It can also be constituted by an adequately pervious material, or be made up of several belts placed side by side. The liquids thereafter flow out through the edges of the roller race 48, via draining holes, not shown, and they are collected in a bowl 74 spreading through the whole lower surface beneath the drum 38 and the squeezing roller assembly 52.

The frame 50 of the roller race 48 is fast with two side plates 76, 78, as illustrated in FIG. 2, one only of which is visible in partially stripped illustration in FIG. 1, which side plates support the shaft 80 of drum 38, said shaft comprising two eccentric members 82 about which rotates the drum. Thus, by slightly pivoting the shaft 80, it is possible to change the position of the drum axis XX, at discretion, with respect to the axis of curvature YY of the roller race 48, and in doing so to change the degree of variation of the gap e separating the drum from the roller race, as a function of the filtering conditions.

As illustrated by FIG. 2 and by the enlarged scale view of FIG. 3, the drum 38 is provided at its two ends with two bordering radial flanges 84 and 86, spaced apart by a distance substantially equal to the length of the squeezing rollers 52. This particular arrangement has the double advantage of accurately guiding the squeezing rollers and of forming an efficient barrier on the edge of the filtering webs 16, 24. Moreover, in case the rollers are placed slightly askew with respect to the drum, then they are automatically replaced in a direction parallel to the drum axis by friction against one of the end flanges of which the tangential speed is twice the rollers moving speed.

The press-filter according to the invention works as follows :

A motor 88 drives the driving roller 40 and the leading web 32. In turn, said leading web 32, being wound about the two filtering webs IB, 24 over most of the circumference of drum 38, drives the filtering webs in the direction of the moving path described hereinabove.

The materials to be filtered 90 fed as a layer onto the filtering web 16 from the feeding hopper 14 follow the descending path of the filtering web iB while draining off into tank 22 up to roller 20 from which they are confined between the two webs 16 and 24.

After guide roller 36, and around drum 38, the leading web 32 applies the two filtering webs 16, 24 and the confined materials 90, against the drum 38. From the start 48a of roller race 48, the materials to be filtered 90 are subjected to, alternately, compression/shearing followed by a relaxation when passing over each squeezing roller 52, and this successively to the end of the roller race 48b, the gap between filtering webs 16, 24 reducing progressively as explained hereinabove.

Upon every alternance of compression/shearing and relaxation, the solid materials undergo a creeping which causes the interstitial volume reserved for the liquids to reduce more and more.

Given also that the filtering webs 16, 24 and the leading web 32 occupy the whole width between the end flanges 84, 88 of the drum 38, as can be seen in FIG. 3, the end flanges prevent any leaking out of the materials 90 over the edges of the filtering webs 16, 24, which leaking out could otherwise occur without such an arrangement.

Because of the mounting of squeezing rollers 52, produced preferably from steel tubes or round bars and covered with a coating of appropriate plastic material, and moving on a rigid roller race 48, produced preferably from a metal plate 49 bent to the desired curvature, said plate being very thick and supported by strong U- or I-sectional pieces, all risks of the squeezing rollers 52 bending and being worn out by their supports is eliminated Thus, when emerging from the squeezing rollers 52, the materials 90 confined between the filtering webs 16, 24 have a very high concentration of solid materials.

As will be readily understood, the press-filter is simple but extremely strong in design this resulting in an advantageous performance/cost ratio. This is also due to the use of a leading web 32 which is separate from the two filtering webs 16, 24. Indeed, the driving force and the resisting force, i.e. essentially the sum of the forces resulting from the squeezing of the materials at each passage of a squeezing roller, are borne by the leading web 32 alone, the structure of which web may be defined to that end essentially, except for the passages 72 traversing it at regular intervals for draining the liquids, whereas the filtering webs 16, 24 can only withstand relatively small forces and can be designed solely for fulfilling perfectly their filtering function, without the need for finding a compromise between the requirements of efficiency and resistance, as with the existing prior art filters.

Advantageously, the leading web 32 is made from a cloth woven in highly resistant yarns.

Moreover, it is found that the operation of the filter is readily controllable, by means of an optional control device, the operation of which is schematized as follows : a torque sensor 92 delivers a signal representing the driving torque supplied by the motor 88 driving the roller 40. A control unit 94 compares this signal to a predetermined reference value, which can optionally be adjusted, and issues a positive or negative control signal, as a function of the difference between the signal and the reference value.

A servomechanism 96, associated to a lever 97 fast with the shaft 80 of drum 38, receives the control signal and causes said shaft, as well as the eccentric members provided thereon, to pivot in one direction or another depending on the sign an on the amplitude of the received signal, in order to reduce or to increase the variation of the gap e between the drum 38 and the rigid roller race 48.

Thus, if the reduction of the gap, measured at the inlet 48a and at the outlet 48b of the rigid roller race, is high, the resisting forces exerted on the leading web 32 will also be high and will create a high driving torque. The control device 92, 94, 96, 97 will then react by moving shaft 80 and the eccentric mounting members 82 of drum 38 in one direction which will bring the reduction of gap e to a smaller value.

Depending on the properties of the liquids to be filtered and/or on the materials that they contain, and in particular the corrosive properties, the different parts constituting the filter may either be given appropriate coatings or surface treatments, or can he produced from corrosion-resistant materials.

It is worth noting that the dimensions of the press-filter according to the invention, particularly as regards ground space, ar extremely reduced, due essentially to its design which permits a large number of compressions to be carried out followed by successive relaxations, over an extremely short path.

With the exception of the drum 38, of which the diameter may vary between a few tens of centimeters and a few meters, depending on the proposed applications, all the movable parts are of small dimensions and may be easily removed for periodical maintenance or repair.

Finally, the solid curved roller race must be understood as embodying several curved profiles, the simplest one being a circular profile, and more complicated profiles such as logarithmically curved profiles. In such cases, the internal surface of the of the rigid roller race can be given the wanted profile either during its bending operation or by machining.

I claim:

1. A press-filter comprising a chassis, two endless filtering webs, rollers mounted on to the chassis and defining paths for the two webs, which paths are at least partially contiguous, and several sets of guide rollers located on either side of the webs along their contiguous path portions and squeezing the webs, wherein one of the rollers is a drum, the filter comprises a rigid roller race having a fixed curvature and at least partially encircling said drum and spaced therefrom by a predetermined gap, and plurality of squeezing rollers rollably mounted on said roller race, the filtering webs encircling said drum over a major portion of its periphery and passing between the drum and the squeezing rollers.

2. A press-filter as claimed in claim i, wherein said squeezing rollers constitute an endless chain driven along a closed path comprising a first portion extending along the roller race and a second, return portion, external to the roller race.

3. A press-filter as claimed in claim 1, wherein the drum is provided with draining passages through its periphery.

4. A press-filter as claimed in claim 1, wherein the drum comprises a one-piece outer cylinder provided with ribs which extend in parallel to the axis of the drum and a wire wound around the ribs into a succession of non-contacting wounds.

5. A press-filter as claimed in claim 1, wherein the drum comprises a one-piece outer cylinder provided with ribs which extend in parallel to the axis of the drum and a low-gauge mesh wound around the ribs.

6. A press-filter as claimed in claim i wherein the drum is provided with two radial end flanges, said flanges being spaced apart by a distance substantially equal to the length of the squeezing rollers.

7. A press-filter as claimed in claim 6, wherein the filtering webs have a width substantially equal to the distance between said radial end flanges of the drum.

8. A press-filter as claimed in claim 1, wherein it comprises a closed loop leading web, guide rollers defining a path for said leading web, said path being also contiguous to the paths of the filtering webs, at least within the gap separating the drum from the rigid roller race, the leading web being located between the squeezing rollers and the filtering webs.

9. A press-filter as claimed in claim 8, wherein the leading web also comprises draining passages therethrough.

10. A press-filter as claimed in claim 8, wherein the leading web is made of a cloth 11. A press-filter as claimed in claim 8, wherein the drum is provided with two radial end flanges, said flanges being spaced apart by a distance substantially equal to the length of the squeezing rollers, and the leading web has a width substantially equal to the distance between the flanges of the drum.

12. A press-filter as claimed in any one of claims 1 to 11, wherein said drum includes a shaft and the rigid roller race comprises a frame fixedly attached to the chassis of the filter, said frame comprising side plates which support the shaft of the drum, the shaft comprising eccentric members which are adjustable by pivoting the shaft.

13. A press-filter as claimed in claim 8, wherein the drum, the guide rollers for the filtering webs and for the leading web and the squeezing rollers are idle rollers, except for one of the guide rollers for the leading web which is coupled to a motor drive.

14. A press-filter as claimed in claim 13, wherein said drum includes a shaft and the rigid roller race comprises a frame fixedly attached to the chassis of the filter, said frame comprising side plates which support the shaft of the drum, said shaft comprising eccentric members which are adjustable by pivoting the shaft, and that the press-filter comprises a control unit including a torque sensor associated to the motor drive and an adjustment servomechanism associated to the shaft of the drum having eccentric members.

* * * * *